United States Patent Office 3,574,727
Patented Apr. 13, 1971

3,574,727
PURIFICATION OF TEREPHTHALIC ACID
Wallace E. Taylor and Enrique R. Witt, Corpus Christi, Tex., and Kwang Yuen Zee-Cheng, Kansas City, Mo., assignors to Celanese Corporation, New York, N.Y.
No Drawing. Filed Oct. 16, 1967, Ser. No. 675,289
Int. Cl. C07c 51/42
U.S. Cl. 260—525
9 Claims

ABSTRACT OF THE DISCLOSURE

A process for purifying crude terephthalic acid by dissolving the terephthalic acid in acetic anhydride and adding peracetic acid to oxidize at least one of the impurities present in solution.

BACKGROUND OF THE INVENTION

This invention is directed to a process for purifying crude terephthalic acid.

The liquid phase air oxidation of para-xylene, isomers thereof, and similar di-alkyl benzenes, wherein the alkyl group contains at least two carbon atoms, so as to produce phthalic acids is well documented in the art. One commercial process which is commonly used because of its flexibility and low costs involves the halogen activation of a metal such as cobalt which is subsequently used to catalyze the air oxidation of the alkyl substituents coming off of the benzene ring of the above-noted compounds. Air is commonly used in such a reaction although oxygen or other oxidizing materials can be used. Terephthalic acid prepared in this manner contains undesirable impurities such as para-toluic acid and terephthalaldehydic acid. Removal of such impurities requires that the crude, or in other words impure, terephthalic acid be dissolved in solution so that the impurities will become disassociated therefrom. Prior art attempts to purify such crude terephthalic acid have generally been unsuccessful because of the extreme insolubility of terephthalic acid in most solvents which deters substantially all efforts toward purification, and the similarity in the solubilities of terephthalic acid and terephthalaldehydic acid which is an additional hindrance to be considered even if proper solvents were found. The importance of discovering a process for separating terephthalic acid from its impurities is demonstrated by the fact that terephthalic acid is used today in large quantities as an intermediate in the preparation of synthetic linear polyesters having fiber and film forming properties. The terephthalic acid used in such a manner must be substantially pure in order to obtain polyester films and fibers having the desired color and physical properties. For example, when commercial, impure, terephthalic acid produced by a liquid phase air oxidation process is reacted with ethylene glycol to produce a polyester, the polyethylene terephthalate obtained will be extremely poor in color, have a substantially reduced melting point, and have a degree of crystallinity of polymer substantialy lower than that of polyethylene terephthalate produced by means of an ordinary ester inter-change method. The reduced melting point and reduced crystallinity of the polymer have been attributed to the formation of polyglycol ether esters therein which even in small amounts adversely affect these important properties. While it is not entirely clear why such formation occurs it has been proposed that the presence of certain acidic, presumably para-toluic or terephthalaldehydic acids, and acid forming impurities in the reaction product catalyze the production of the undesirable polyglycol ether esters.

SUMMARY OF THE INVENTION

It is an object of the present invention to provide a process for purifying crude terephthalic acid which contains at least terephthalaldehydic acid as an impurity.

Another object of this invention is the purification of crude terephthalic acid which is obtained by the liquid phase air oxidation of para-xylene.

Other objects and advantages of the present invention will be apparent from the following description of the invention.

The term "crude terephthalic acid" as used in the specification and claims denotes terephthalic acid containing at least terephthalaldehydic acid as an impurity. Under the usual circumstances other impurities may be present, particularly para-toluic acid.

According to this invention the purification of such crude terephthalic acid is accomplished by dissolving the crude terephthalic acid in boiling acetic anhydride, cooling the resulting acetic anhydride solution to a temperature between about 25° and 65° C., adding peracetic acid to the cooled solution so as to oxidize at least a portion and preferably substantially all of the terephthalaldehydic acid present therein to terephthalic acid, and thereafter separately recovering terephthalic acid from which at least a portion of the terephthalaldehydic acid originally present has been removed.

Preferably, the terephthalic acid is recovered substantially free of all impurities.

DESCRIPTION OF THE PREFERRED EMBODIMENTS

As previously mentioned the crude terephthalic acid which may be purified according to the present invention contains at least terephthalaldehydic acid as an impurity. Preferably, the crude feed is the product of the aforementioned para-xylene liquid phase air oxidation process. Typically, such a crude terephthalic acid contains in the range of from about 1.5 to 3 weight percent of terephthalaldehydic acid and from about 2 to 8.5 weight percent of para-toluic acid as impurities, the weight percent being based on the weight of the crude terephthalic acid.

The first step in the present purification process comprises dissolving the crude terephthalic acid in boiling acetic anhydride. At atmospheric pressure acetic anhydride has a boiling point of 140° C. However, since the use of higher or lower pressure is within the scope of the present invention, under such circumstances the acetic anhydride will have a proportionately different boiling point. For example, at a pressure of 160 mm. Hg the acetic anhydride will have a boiling point of approximately 118° C. and at 1000 mm. Hg pressure, acetic anhydride will boil at approximately 146° C.

The advantages realized in using acetic anhydride as opposed to other solvents arise from the fact that virtually no other neutral oxidation-stable solvent is known which is capable of dissolving practical amounts, i.e. from about 5 to 20 weight percent, of terephthalic acid at room temperature, based on the weight of the solvent. The importance of utilizing a solvent which is capable of such dissolution is seen in the fact that crude terephthalic acid must be dissolved in solution in order to free the impurities from the physical structure of the terephthalic acid, particularly terephthalaldehydic acid, so that the terephthalaldehydic acid may react with peracetic acid which is subsequently added to the solution. It has been found as part of the present invention that boiling acetic anhydride will dissolve from about 7 to 11 weight percent of crude terephthalic acid, thus permitting a practical purification process.

After the crude terephthalic acid is dissolved, the resulting solution is cooled to a temperature in the range of from about 25° to 65° C. Reduction of the temperature of the solution is necessary in order to prevent a thermal breakdown of the peracetic acid which is to be added as an oxidizing agent. At the lower temperature, within the range mentioned above, the solution will remain super-saturated for several hours permitting a convenient oxidation reaction.

Any excess crude terephthalic acid which may have been added to the acetic anhydride, and which remains undissolved in the solution, may be removed, for example, by filtration; preferably prior to the addition of the peracetic acid.

Peracetic acid may then be added to the super-saturated solution in an amount of from about 0.5 to 10 parts by weight, and preferably from about 1 to 5 parts by weight, per part by weight of the terephthalaldehydic acid dissolved in the solution. While the peracetic acid may be added in any convenient manner, it is preferably in the form of a 1 to 30 weight percent acetic acid solution, and more preferably, a 1 to 10 weight percent acetic acid solution.

The peracetic acid oxidizes the terephthalaldehydic acid to terephthalic acid but has substantially no effect on the para-toluic acid which ordinarily is also present as an impurity. The oxidation reaction will generally require from about 1 to 5 hours, but preferably from about 2 to 4 hours.

The terephthalic acid, including that which is obtained by oxidation of the terephthalaldehydic acid, is thereafter recovered from the solution through crystallization, as for example, by adding thereto from about 1 to 30 weight percent of acetic acid, based on the weight of the reaction solution.

In the usual case where practically the only impurities present in the crude terephthalic acid are terephthalaldehydic acid and para-toluic acid, the oxidation of the aldehydic acid to terephthalic acid will essentially leave only para-toluic acid as an impurity of substantial amount in the solution. Following filtration to recover the crystallized terephthalic acid, this para-toluic acid will be contained in the mother liquid and may be separately disposed of along with the filtrate.

The terephthalic acid resulting from the process thus described will be purged of at least a portion of the terephthalaldehydic acid originally present in the crude terephthalic acid. Such purified terephthalic acid will generally contain less than about 0.5 weight percent of terephthalaldehydic acid, based on the weight of the terephthalic acid, preferably between about 0.1 and 0.4 weight percent of terephthalaldehydic acid, and more preferably between about 0.05 and 0.2 weight percent of the terephthalaldehydic acid. The purified terephthalic acid will also be purged of substantially all (i.e., between about 0.05 and 0.1 weight percent, based on the terephthalic acid) of the para-toluic acid which was originally in the crude terephthalic acid.

In order to realize a further reduction in impurities, the recovered terephthalic acid should be recrystallized from water. For such recrystallization purposes the water will be heated to a temperature between about 240° and 280° C. with sufficient pressure to maintain the water in a liquid state. Generally, pressures of between 1000 and 1450 p.s.i.g. will be required at such temperatures. The terephthalic acid may be dissolved in the heated solution which is then subsequently cooled to room temperature so as to precipitate additionally purified terephthalic acid which may be recovered by any suitable means, for example, by filtration. The additionally purified terephthalic acid will generally contain less than about 0.03 weight percent of terephthalaldehydic acid, based on the weight of the terephthalic acid, and less than about 0.01 weight percent of the para-toluic acid.

In the absence of indications to the contrary, all proportions and concentrations of material are expressed on a weight basis.

The following examples will further illustrate the invention:

EXAMPLE I

The present example illustrates the results obtained from a process including the recrystallization of terephthalic acid from acetic anhydride without oxidation of the impurities with peracetic acid.

15 grams of crude terephthalic acid (1.6% terephthalaldehydic acid) was dissolved in 250 grams of acetic anhydride boiling at a temperature of 140° C. The dissolved terephthalic acid was crystallized from solution by cooling to 25° C. and allowing the solution to stand for 24 hours. The precipitate was filtered, dried and analyzed for terephthalaldehydic acid content. The analysis showed 0.5 to 1.0%% aldehydic acid present.

EXAMPLE II

This example shows the contrasting results achieved when the aldehydic acid present as an impurity in the acetic anhydride solution is oxidized by peracetic acid treatment.

15 grams of crude terephthalic acid containing 1.5% terephthalaldehydic acid as an impurity was dissolved in 250 grams of acetic anhydride and filtered. Three such solution were allowed to cool to temperatures of 65°, 45° and 25° C., respectively. To each sample 3.5 grams of 28.7% solution of peracetic acid in acetic acid was added with stirring. 50 ml. of each sample was taken at intervals of 30 minutes, 1, 2 and 4 hours and diluted with 10 ml. of acetic acid to spring the terephthalic acid. The solid isolated in solution was collected by filtration, washed, dried and analyzed for terephthalaldehydic acid by polarographic methods. The results achieved in each instance are set forth in Table 1.

TABLE 1.—PERACETIC ACID OXIDATIONS IN ACETIC ANHYDRIDE SOLUTIONS

| Temperature, ° C. | Time | Terephthalaldehydic acid, percent |
| --- | --- | --- |
| 25 | 30 minutes | 0.64 |
|  | 1 hour | 0.51 |
|  | 2 hours | 0.35 |
|  | 4 hours | 0.21 |
| 45 | 30 minutes | 0.15 |
|  | 1 hour | 0.10 |
|  | 2 hours | 0.10 |
|  | 4 hours | 0.10 |
| 65 | 30 minutes | 0.18 |
|  | 1 hour | 0.12 |
|  | 2 hours | 0.10 |

EXAMPLE III

Water recrystallization of peracetic acid treated terephthalic acid 3.2 grams of terephthalic acid purified according to a process as described in Example II were dissolved in 40 ml. of deionized water at 250° C. and kept for 15 minutes at a maximum pressure of 1450 p.s.i.g. The solution was cooled to room temperature and the resulting precipitate filtered off. Analysis of the purified terephthalic acid showed a terephthalaldehydic acid content of only 0.03%.

The principle, preferred embodiments and modes of operation of the present invention have been described in the foregoing specification. However, it should be understood that the invention which is intended to be protected herein may be practiced otherwise than as described without departing from the appended claims.

What is claimed is:

1. A process for purifying crude terephthalic acid containing at least terephthalaldehydic acid as an impurity which comprises:
   dissolving the crude terephthalic acid in boiling acetic anhydride,
   cooling the acetic anhydride solution to a temperature between 25° and 65° C.,
   adding peracetic acid to the cooled solution in order to oxidize at least a portion of the terephthalaldehydic acid to terephthalic acid, and
   thereafter separately recovering terephthalic acid from which at least a portion of the terephthalaldehydic acid originally present has been removed.

2. A process according to claim 1 wherein the peracetic acid is added in an amount of from about 0.5 to 10 parts by weight per each part by weight of terephthalaldehydic acid present in solution.

3. A process according to claim 2 wherein the peracetic acid is allowed to react with the terephthalaldehydic acid for a period of time between 2 and 4 hours.

4. A process according to claim 3 wherein the peracetic acid is a 1 to 30 weight percent acetic acid solution.

5. A process according to claim 4 wherein the separately recovered terephthalic acid contains less than 0.5 weight percent of terephthalaldehydic acid, based on the weight of the terephthalic acid.

6. A process according to claim 3 wherein from about 1 to 30% by weight of acetic acid, based on the weight of the reaction solution, is added to the solution, after the period of time for the peracetic acid reaction has expired, so as to precipitate the purified terephthalic acid.

7. The process according to claim 2 wherein the recovered terephthalic acid is further purified by
   adding the recovered terephthalic acid to water so as to produce a 10 to 20% solution,
   heating the solution to between 250° and 280° C. at a pressure of between 1000 and 1450 p.s.i.g.,
   cooling the solution to recrystallize the additional purified terephthalic acid, and
   recovering the precipitated terephthalic acid from solution.

8. A process according to claim 7 wherein the additionally purified terephthalic acid recovered from solution contains less than 0.03 weight percent of terephthalaldehydic acid based on the weight of the terephthalic acid.

9. A process for purifying crude terephthalic acid which contains as impurities from about 1.5 to 3 weight percent of terephthalaldehydic acid and from about 2 to 8.5 weight percent of para-toluic acid, said process comprising:
   dissolving the crude terephthalic acid in boiling acetic anhydride,
   cooling the acetic anhydride solution to a temperature between 25° and 65°,
   adding from about 1 to 5 parts by weight of peracetic acid per each part by weight of terephthalaldehydic acid present in solution to the cooled solution and allowing it to react for a period of time between 1 and 5 hours so as to convert substantially all of the terephthalaldehydic acid to terephthalic acid,
   adding from about 1 to 30% by weight of acetic acid, based on the weight of the reaction solution, to the solution so as to precipitate terephthalic acid including the terephthalaldehydic acid which has been converted to terephthalic acid,
   filtering the precipitated terephthalic acid from solution, said solution containing substantially all of the para-toluic acid originally present as an impurity in the crude terephthalic acid, and
   recovering terephthalic acid which contains less than about 0.5 weight percent of terephthalaldehydic acid based on the weight of the terephthalic acid, and between about 0.05 and 0.1 weight percent, based on the weight of the terephthalic acid, of para-toluic acid.

References Cited

UNITED STATES PATENTS

| | | | |
|---|---|---|---|
| 2,838,565 | 6/1958 | Heath et al. | 260—525 |
| 3,261,860 | 7/1966 | Becke et al. | 260—524 |
| 3,288,849 | 11/1966 | Meyer | 260—525 |
| 3,361,804 | 1/1968 | Alagy | 260—525 |

FOREIGN PATENTS

| | | | |
|---|---|---|---|
| 982,629 | 2/1965 | Great Britain | 260—525 |

OTHER REFERENCES

Whitmore, Organic Chemistry, 1937, pp. 295–6.

LORRAINE A. WEINBERGER, Primary Examiner

R. S. WEISSBERG, Assistant Examiner